July 10, 1962 H. D. POST 3,043,364

TAPE SPLICER

Filed July 5, 1957 2 Sheets-Sheet 1

INVENTOR.
Herman D. Post

BY Michael S. Striker
agt.

July 10, 1962 H. D. POST 3,043,364

TAPE SPLICER

Filed July 5, 1957 2 Sheets-Sheet 2

INVENTOR.
Herman D. Post

BY Michael S. Striker
agt.

3,043,364
TAPE SPLICER

Herman D. Post, 214—26 41st Ave., Bayside 61, N.Y.

Filed July 5, 1957, Ser. No. 670,006
11 Claims. (Cl. 156—505)

The present invention relates to tape splicers.

More particularly, the present invention relates to tape splicers which are capable of being used for repairing a break in an elongated tape such as a recording tape. When tapes of this type are manually repaired with a strip of adhesive and scissors, for example, it is very difficult to quickly and easily provide a satisfactory repair.

One of the objects of the present invention is to provide a tape splicing structure which will permit a pair of tape ends to be spliced together in a simple, quick manner and with the use of an exceedingly simple structure which is inexpensive to manufacture.

Another object of the present invention is to provide a tape splicer wherein all of the cutting may be carried out with a conventional razor blade such as a single edge razor blade.

It is also an object of the present invention to provide a tape splicing structure which will not dull the cutting edge of a razor blade or the like, which has no moving parts, and which will give a long period of reliable service.

With the above objects in view the present invention mainly consists of a tape splicer which includes a block which has a pair of opposed ends and a pair of opposed side edges extending between these ends. This block is formed in its top face with a tape aligning groove extending from one to the other of the ends of the block between the side edges thereof, and the block is also formed with an adhesive strip accommodating groove extending from one to the other of the side edges of the block between the ends thereof, so that these grooves intersect each other and provide the block with four projections extending upwardly from the bases of the grooves and defining the lateral limits of the grooves. These projections respectively are formed with blade guiding notches adjacent the intersection of the grooves for guiding a blade during trimming of a spliced tape. A pair of blade guiding means are respectively located adjacent the side edges of the block in the strip accommodating groove respectively adjacent the opposite sides of the latter groove for guiding a blade to cut across a pair of overlapping tapes in the tape aligning groove prior to the application of an adhesive strip to the tape.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
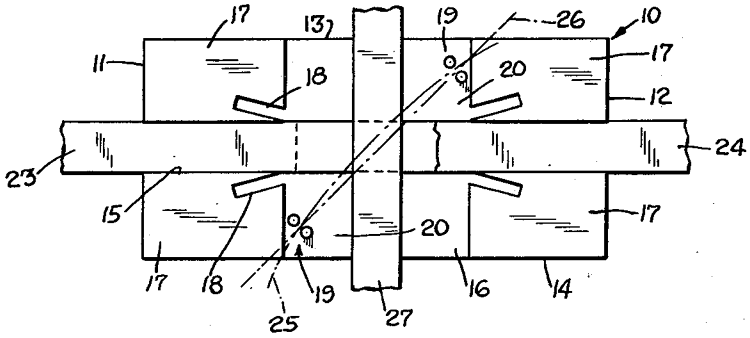
FIG. 1 is a top plan view of a block used for splicing tape according to the present invention.
Figure 2:
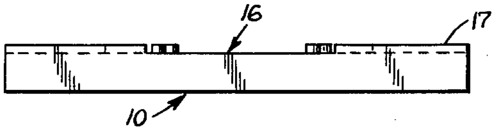
FIG. 2 is a side elevational view of the block of FIG. 1.

Referring to FIGS. 1 and 2 it will be seen that the structure illustrated therein is in the form of a block 10 which may be made of a molded plastic material which also preferably has some resilience so that it will not dull the cutting edge of a blade. For example, the block may be made of polyethylene, polystyrene, polyvinylchloride, or cellulose acetate butyrate.

The top face of the block 10, which is of rectangular configuration, is visible in FIG. 1. The block 10 has a pair of opposed ends 11 and 12 and a pair of opposed side edges 13 and 14. The block 10 is formed in its top face with an elongated tape aligning groove 15 which extends from the end 11 to the end 12 of the block and which is located between the side edges 13 and 14. Also, the block 10 is formed with an adhesive strip accommodating groove 16 which extends from the side edge 13 to the side edge 14 and which is located between the ends 11 and 12 of the block 10. Thus, the grooves 15 and 16 intersect each other and they form on the block 10 four projections 17 which extend upwardly from the bases of the grooves 15 and 16 and which define the lateral limits of the grooves 15 and 16. Each of the projections 17 is formed with a blade guiding notch 18, and in the example shown in FIG. 1 each of the blade guiding notches extends from the intersection of the grooves 15 and 16 substantially along a diagonal line extending from the intersection of one of the ends 11 and 12 and one of the side edges 13 and 14 to the intersection of the other of these ends and the other of these side edges.

Furthermore, the block 10 is provided with a pair of blade guiding means 19, and in the example of FIG. 1 each of these blade guiding means 19 is in the form of a pair of posts 20 formed integrally with the block 10 and extending upwardly from the base of the groove 16. As is apparent from FIG. 1 the pair of blade guiding means 19 are respectively located adjacent the opposite side edges 13 and 14 of the block 10 and adjacent the opposite sides of the groove 16, the posts 20 of each blade guiding means 19 being located relatively close to each other. As is apparent from FIG. 2, the projections 17 do not have a very great depth and the grooves 15 and 16 are relatively shallow since they need only accommodate tapes and the like therein. The entire block 10 is of relatively small size insofar as its length and width are concerned and is of a relatively small thickness.

Figure 8:
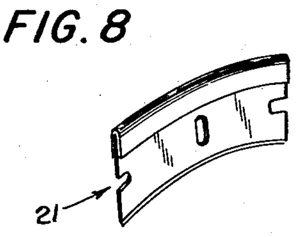
FIG. 8 is a perspective view of a curved blade capable of being used with the splicing structure of the invention.
Figure 9:
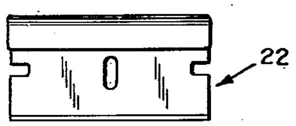
FIG. 9 is an elevational view of a straight blade capable of being used with the splicing structure of the invention.

The above-described structure is used together with blades such as the razor blades shown in FIGS. 8 and 9 in order to splice a pair of tape portions together. The blade 21 of FIG. 8 is a conventional single-edged razor blade which has been longitudinally curved for a purpose described below, this curved blade being particularly suitable for use with the block of FIGS. 1 and 2. The blade 22 of FIG. 9 is a conventional straight single-edge razor blade.

The above-described structure is used as follows: As may be seen from FIG. 1, a pair of tape portions 23 and 24 which are to be spliced together are placed in the tape aligning groove 15, which the tape portions extending toward each other from opposite ends of the groove and the free ends of the portions 23 and 24 overlap each other at the intersection of the grooves 15 and 16. In the example shown in FIG. 1 the tape portion 23 has its right free end portion located on top of the left free end portion of the tape 24. With the tape in this position, the blade 21, for example, is moved downwardly along the pair of blade guide means 19 by placing the ends of the blade respectively between the pair of posts of the pair of blade guide means 19, and in this manner the overlapping portions of the tape 23 and 24 are cut along the line 25. However, it is preferred to use the straight blade 22 of FIG. 9 in the blade guiding means 19 so as to provide a straight cut extending along the line 26 shown in FIG. 1, this cut extending diagonally across the overlapping portions of the tapes 23 and 24. The tapes 23 and 24 may be conventional sound recording tape and the groove 15 is only slightly narrower than the tape 23 and 24 so that the latter is held in position by the sides of the groove 15.

After the overlapping portions of the two tapes 23 and 24 are thus cut across by the use of either of the blades 21 or 22 the tape portion 23 will have a free end part located to the right of the cut, as viewed in FIG. 1, and located on top of the tape portion 24, and this free part may be removed as by being blown away, for example. The free part of the tape 24 to the left of the cut across the overlapping portions of the tape remains beneath the tape 23 which is not moved.

At this time an adhesive strip 27 is placed in the groove 16 across the cut provided in the manner described above, so that the two tape portions 23 and 24 which abut against each other at the diagonal cut are fastened together by the part of the adhesive strip 27 which overlies the abutting ends of the two tape portions and which adheres to the two tape portions. Of course, the blade 21 or the blade 22 is removed after the cut across the overlapping portions of the tape has been made.

Figure 3:
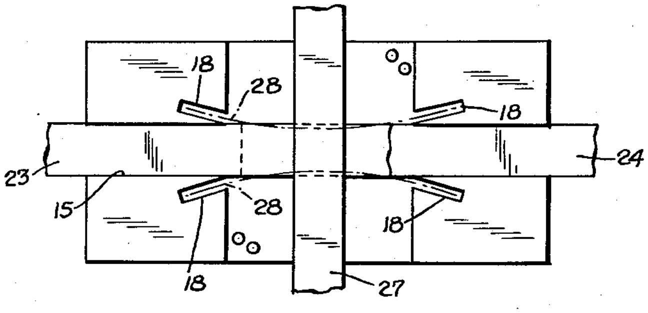
FIG. 3 is a view showing the block of FIG. 1 in top plan view and illustrating how the structure is used during trimming of a spliced tape.

FIG. 3 shows the structure of FIG. 1 with the two tape portions 23 and 24 held together by the adhesive strip 27, after the cut has been provided across the overlapping portions of the two tapes and after the part severed from the right end of the tape 23 has been removed. With the parts at this stage of the splicing operation, the curved blade 21 is placed with its ends first in the pair of notches 18 at one side of the groove 15 and then in the pair of notches 18 at the other side of the groove 15, so that a pair of curved cuts extending along the arcuate lines 28 are made. This is the trimming cut, and it will be noted that at the splice the width of the tape is reduced so that there can be no projecting part of the adhesive strip 27 which will undesirably influence the operation of a tape recorder, for example. Thus, the free portions of the adhesive strip 27 which extend laterally beyond the pair of tapes 23 and 24 are cut away, and after these free portions are removed the splice is completed. The thus joined tape portions 23 and 24 are simply removed from the block 10 and the free end part of the tape portion 24 which has been cut therefrom by the diagonal cut across the overlapping portions of the tapes 23 and 24 simply remains in the groove 15 and can be blown away or simply falls from the spliced tape.

Thus, it is apparent that with the exceedingly simple structure described above it is possible in a very simple quick manner to provide a tape splice which is of professional quality.

Figure 4:
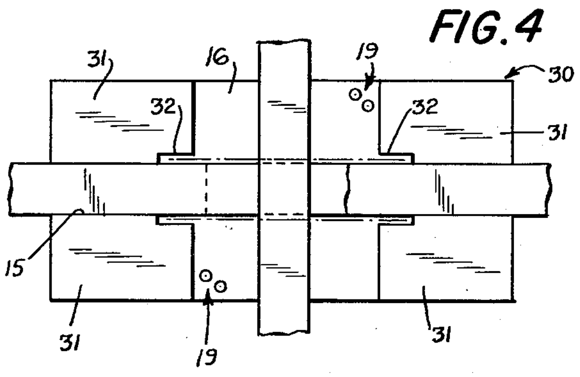
FIG. 4 is a top plan view of a different embodiment of a block which is capable of being used exclusively with a straight blade.

The block 30 which is shown in a top plan view in FIG. 4 is identical in all respects with the block 10 described above except that the projections 31 which respectively correspond to the projections 17, instead of being provided with diagonally extending blade guiding notches 18 are provided with the notches 32 shown in FIG. 4. These notches 32 extend also from the intersection of the grooves 15 and 16, but they extend parallel to the groove 15 and communicate therewith, as indicated in FIG. 4. The structure of FIG. 4 is used in the same way as the above-described structure of FIGS. 1–3, the only difference being that the blade 22 of FIG. 9 is used exclusively with the block of FIG. 4. Thus, the diagonal cut across the overlapping tape portions is provided with the straight blade 22 in cooperation with the pair of blade guiding means 19, and when the trimming takes place the straight blade is guided in the notches 32 first on one side of the groove 15 and then on the other side of the groove 15 so that a pair of cuts extending along the lines 33 are provided, and these cuts extend along the side edge of the spliced tape so as to trim away the adhesive strip without leaving any portion thereof extending laterally beyond the spliced tape. This result is brought about by the fact that the groove 15 is of practically the same width as the recording tape or the like which is to be spliced together, and the notches 32 are just wide enough to accommodate the thickness of the blade 22 so that a very accurate trimming of the adhesive strip precisely at the side edges of the tape is provided. Otherwise the embodiment of FIG. 4 is identical with that described above.

Figure 5:
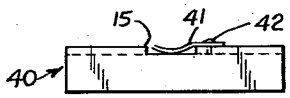
FIG. 5 is an end view of a block according to the present invention, this block being provided with a springy finger for holding a tape in position.

With all of the above embodiments it is possible to provide springy fingers for holding the pair of tapes which are to be spliced together in position, and FIG. 5 shows a block 40 in end view which is provided with a springy finger 41 extending into the tape aligning groove 15. This springy finger 41 is fastened to the block 40 in any suitable way as by the rivet 42, and as is apparent from FIG. 6 which shows the block 40 in a top plan view a pair of springy fingers 41 are provided at the opposite ends of the groove 15 and they extend slightly beyond the ends of the groove 15 so that it is easy for the operator to raise the springy fingers slightly in order to slip beneath these springy fingers and into the groove 15 the two tape portions which are to be spliced together. Although the springy fingers 41 are shown in conjunction with the block 40 of FIG. 6, it is to be understood that they are also capable of being used with any of the embodiments of the invention.

Figure 6:
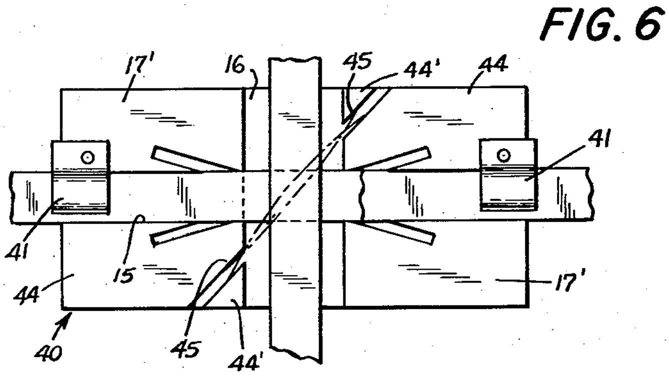
FIG. 6 is a top plan view of another embodiment of a tape splicing block according to the present invention, FIG. 6 showing how such a block may be provided with a pair of springy fingers for holding a pair of tape ends in position.

With the embodiment of FIG. 6 the block 40 is identical with that of FIG. 1 except that the pair of blade guiding means 19 takes a different form. Thus, the pair of diagonally opposed projections 17′ of the block 40 are longer than the upper left and lower right projections 17 of FIG. 1. Also, the projections 44 of the block 40 are somewhat longer than the corresponding projections 17 of FIG. 1, and at their side edges which define part of the groove 16, these projections 44 are respectively formed with slots 45, thus providing each projection 44 with a separate portion 44′. Thus, the projections 44 which are respectively provided with the slots 45 form a pair of blade guide means capable of performing the same function as the blade guide means 19 and located in the same way as the latter blade guide means adjacent the opposite side edges of the block and adjacent the opposite sides of the groove 16. The slots 45 are positioned so as to receive the ends of blades 21 or 22 in order to guide these blades while they cut across the overlapping portions of the tapes which are to be spliced together. Except for these differences the embodiment of FIG. 6 is identical with that of FIG. 1.

Figure 7:
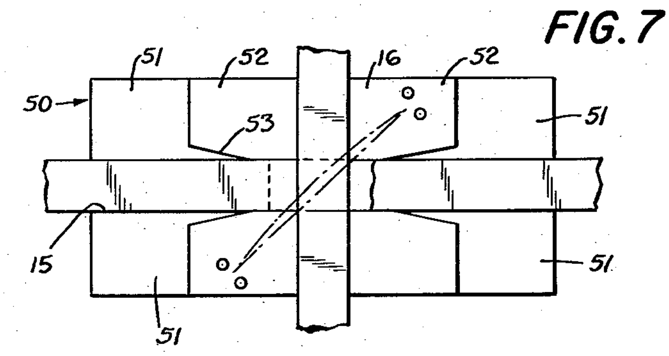
FIG. 7 is a top plan view of still another embodiment of a tape splicing block according to the present invention.

The block 50 which is shown in FIG. 7 is identical with that of FIG. 1 except that the projections 51 which respectively correspond to the projections 17 have notches 52 which respectively extend from the opposite side edges of the block 50 toward the intersection of the grooves 15 and 16. These notches terminate adjacent to the groove 15 respectively in end faces 53 each of which extend substantially along a line extending from the intersection of one of the side edges and ends of the block to the intersection of the other of the side edges and ends of the block. Thus, with the embodiment of FIG. 7 it is unnecessary to provide notches 18. The end faces 53 of the notches 52 guide the curved blade 21 of FIG. 8 in the same way as the notches 18, as is indicated in FIG. 7. Otherwise the embodiment of FIG. 7 is the same as that of FIG. 1.

It will be understood that each of the elements described above, or two or more together, may also find a useful application in other types of tape splicers differing from the types described above.

While the invention has been illustrated and described as embodied in manually operable tape splicers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a tape splicer, in combination, a block having a pair of opposed ends and a pair of opposed side edges extending between said ends, said block being formed in a top face thereof with a tape aligning groove extending from one to the other of the ends of said block between said side edges thereof and with an adhesive strip accommodating groove extending from one to the other of the side edges of said block between said ends thereof, said grooves intersecting each other and forming a smooth continuous surface at their intersection and providing said block with four projections extending upwardly from the bases of said grooves and defining the lateral limits of said grooves, said projections respectively being formed with blade guiding notches adjacent the intersection of said grooves for guiding a blade during trimming of a spliced tape; and a pair of blade guiding means respectively located adjacent said side edges of said block in said strip accommodating groove respectively adjacent the opposite sides of the latter groove for guiding a blade to cut across a pair of overlapping tapes in said tape aligning groove prior to the application of an adhesive strip to said tapes.

2. In a tape splicer, in combination, a block having a pair of opposed ends and a pair of opposed side edges extending between said ends, said block being formed in a top face thereof with a tape aligning groove extending from one to the other of the ends of said block between said side edges thereof and with an adhesive strip accommodating groove of the same depth as said tape aligning groove extending from one to the other of the side edges of said block between said ends thereof, said grooves intersecting each other and forming a smooth continuous flat surface of their intersection and providing said block with four projections extending upwardly from the bases of said grooves and defining the lateral limits of said grooves, said projections respectively being formed with blade guiding notches adjacent the intersection of said grooves for guiding a blade during trimming of a spliced tape said blade guiding notches having the same depth as said tape aligning groove; and a pair of blade guiding means respectively located adjacent said side edges of said block in said strip accommodating groove respectively adjacent the opposite sides of the latter groove for guiding a blade to cut across a pair of overlapping tapes in said tape aligning groove prior to the application of an adhesive strip to said tapes, each of said blade guiding means being in the form of a pair of posts extending upwardly from the base of said adhesive strip accommodating groove, and said pair of posts of each of said blade guiding means being located closely adjacent to each other, said blade guiding notches and said blade guiding means being the only means for guiding a blade.

3. In a tape splicer, in combination, a block having a pair of opposed ends and a pair of opposed side edges extending between said ends, said block being formed in a top face thereof with a tape aligning groove extending from one to the other of the ends of said block between said side edges thereof and with an adhesive strip accommodating groove extending from one to the other of the side edges of said block between said ends thereof, said grooves intersecting each other and forming a smooth continuous flat surface at their intersection and providing said block with four projections extending upwardly from the bases of said grooves and defining the lateral limits of said grooves, said projections respectively being formed with blade guiding notches adjacent the intersection of said grooves for guiding a blade during trimming of a spliced tape; and a pair of blade guiding means respectively located adjacent said side edges of said block in said strip accommodating groove respectively adjacent the opposite sides of the latter groove for guiding a blade to cut across a pair of overlapping tapes in said tape aligning groove prior to the application of an adhesive strip to said tapes, said pair of blade guiding means being in the form of a pair of notches respectively formed in a pair of diagonally opposed projections, and the latter pair of notches being directed toward said intersection so that the ends of a blade may respectively be located in the latter pair of notches to guide the blade while it cuts across a pair of overlapping tapes, said former and latter pair of notches being the only means for guiding a blade.

4. In a tape splicer, in combination, a block having a pair of opposed ends and a pair of opposed side edges extending between said ends, said block being formed in a top face thereof with a tape aligning groove extending from one to the other of the ends of said block between said side edges thereof and with an adhesive strip accommodating groove at the same depth as said tape aligning groove extending from one to the other of the side edges of said block between said ends thereof, said grooves intersecting each other and forming a smooth continuous flat surface at their intersection and providing said block with four projections extending upwardly from the bases of said grooves and defining the lateral limits of said grooves, said projections respectively being formed with blade guiding notches adjacent the intersection of said grooves for guiding a blade during trimming of a spliced tape said blade guiding notches having the same depth as said tape aligning groove; a pair of blade guiding means respectively located adjacent said side edges of said block in said strip accommodating groove respectively adjacent the opposite sides of the latter groove for guiding a blade to cut across a pair of overlapping tapes in said tape aligning groove prior to the application of an adhesive strip to said tapes; and a blade adapted to be guided by said notches and said pair of blade guiding means for trimming a spliced tape when said blade is guided by said notches and for cutting across a pair of overlapping tapes when said blade is guided by said pair of blade guiding means, said blade guiding notches and said blade guiding means being the only means for guiding a blade.

5. In a tape splicer, in combination, a block having a pair of opposed ends and a pair of opposed side edges extending between said ends, said block being formed in a top face thereof with a tape aligning groove extending from one to the other of the ends of said block between said side edges thereof and with an adhesive strip accommodating groove of the same depth as said tape aligning groove extending from one to the other of the side edges of said block between said ends thereof, said grooves intersecting each other and forming a smooth continuous flat surface at their intersection and providing said block with four projections extending upwardly from the bases of said grooves and defining the lateral limits of said grooves, said projections respectively being formed with blade guiding notches adjacent the intersection of said grooves for guiding a blade during trimming of a spliced tape said blade guiding notches having the same depth as said tape aligning groove; a pair of blade guiding means respectively located adjacent said side edges of said block in said strip accommodating groove respectively adjacent the opposite sides of the latter groove for guiding a blade to cut across a pair of overlapping tapes in said tape aligning groove prior to the application of an adhesive strip to said tapes; and a blade adapted to be guided by said notches and said pair of blade guiding means for trimming a spliced tape when said blade is guided by said notches and for cutting across a pair of overlapping tapes when said blade is guided by said pair of blade guiding means, said blade guiding notches and said blade guiding means being the only means for guiding a blade, said blade being straight.

6. In a tape splicer, in combination, a block having a pair of opposed ends and a pair of opposed side edges extending between said ends, said block being formed in a top face thereof with a tape aligning groove extending from one to the other of the ends of said block between said side edges thereof and with an adhesive strip accommodating groove of the same depth as said tape aligning groove and extending from one to the other of the side edges of said block between said ends thereof, said grooves intersecting each other and forming a smooth continuous flat surface at their intersection and providing said block with four projections extending upwardly from the bases of said grooves and defining the lateral limits of said grooves, said projections respectively being formed with blade guiding notches adjacent the intersection of said grooves for guiding a blade during trimming of a spliced tape, said blade guiding notches having the same depth as said tape aligning groove; a pair of blade guiding means respectively located adjacent said side edges of said block in said strip accommodating groove respectively adjacent the opposite sides of the latter groove for guiding a blade to cut across a pair of overlapping tapes in said tape aligning groove prior to the application of an adhesive strip to said tapes; and a blade adapted to be guided by said notches and said pair of blade guiding means for trimming a spliced tape when said blade is guided by said notches and for cutting across a pair of overlapping tapes when said blade is guided by said pair of blade guiding means, said blade guiding notches and said blade guiding means being the only means for guiding a blade, said blade being curved.

7. In a tape splicer, in combination, a block having a pair of opposed ends and a pair of opposed side edges extending between said ends, said block being formed in a top face thereof with a tape aligning groove extending from one to the other of the ends of said block between said side edges thereof and with an adhesive strip accommodating groove of the same depth as said tape aligning groove and extending from one to the other of the side edges of said block between said ends thereof, so that said grooves intersect each other and form a smooth continuous flat surface at their intersection and provide said block with four projections extending upwardly from the bases of said grooves and defining the lateral limits of said grooves, said projections respectively being formed with blade guiding notches adjacent the intersection of said grooves for guiding a blade during trimming of a spliced tape, said blade guiding notches having the same depth as said tape aligning groove; a pair of blade guiding means respectively located adjacent said side edges of said block in said strip accommodating groove respectively adjacent the opposite sides of the latter groove for guiding a blade to cut across a pair of overlapping tapes in said tape aligning groove prior to the application of an adhesive strip to said tapes, said blade guiding notches and said blade guiding means being the only means for guiding a blade; and a pair of stringy tape-holding fingers carried by said block respectively at opposite sides of said intersection of said grooves and respectively extending into said tape aligning groove for releasably holding tapes therein.

8. In a tape splicer, in combination, a block having a pair of opposed ends and a pair of opposed side edges extending between said ends, said block being formed in a top face thereof with a tape aligning groove extending from one to the other of the ends of said block between said side edges thereof and with an adhesive strip accommodating groove of the same depth as said tape aligning groove and extending from one to the other of the side edges of said block between said ends thereof, said grooves intersecting each other and forming a smooth continuous flat surface at their intersections and provide said block with four projections extending upwardly from the bases of said grooves and defining the lateral limits of said grooves, said projections respectively being formed with blade guiding notches adjacent the intersection of said grooves for guiding a blade during trimming of a spliced tape, said blade guiding notches having the same depth as said tape aligning groove, each of said notches extending from said intersection substantially along a diagonal line extending from the intersection of one of said ends and one of said side edges to the intersection of the other of said ends and the other of said side edges of said block; and a pair of blade guiding means respectively located adjacent said side edges of said block in said strip accommodating groove respectively adjacent the opposite sides of the latter groove for guiding a blade to cut across a pair of overlapping tapes in said tape aligning groove prior to the application of an adhesive strip to said tapes, said blade guiding notches and said blade guiding means being the only means for guiding a blade.

9. In a tape splicer, in combination, a block having a pair of opposed ends and a pair of opposed side edges extending between said ends, said block being formed in a top face thereof with a tape aligning groove extending from one to the other of the ends of said block between said side edges thereof and with an adhesive strip accommodating groove of the same depth as said tape aligning groove and extending from one to the other of the side edges of said block between said ends thereof, said grooves intersecting each other and forming a smooth continuous flat surface at their intersection and providing said block with four projections extending upwardly from the bases of said grooves and defining the lateral limits of said grooves, said projections respectively being formed with blade guiding notches adjacent the intersection of said grooves for guiding a blade during trimming of a spliced tape, said blade guiding notches having the same depth as said tape aligning groove, each of said notches extending from said intersection in a direction parallel to said tape aligning groove and communicating with said tape aligning groove; and a pair of blade guiding means respectively located adjacent said side edges of said block in said strip accommodating groove respectively adjacent the opposite sides of the latter groove for guiding a blade to cut across a pair of overlapping tapes in said tape aligning groove prior to the application of an adhesive strip to said tapes, said blade guiding notches and said blade guiding means being the only means for guiding a blade.

10. In a tape splicer, in combination, a block having a pair of opposed ends and a pair of opposed side edges extending between said ends, said block being formed in a top face thereof with a tape aligning groove extending from one to the other of the ends of said block between said side edges thereof and with an adhesive strip accommodating groove of the same depth of said tape aligning groove and extending from one to the other of the side edges of said block between said ends thereof, said grooves intersecting each other and forming a smooth continuous flat surface at their intersection and providing said block with four projections extending upwardly from the bases of said grooves and defining the lateral limits of said grooves, said projections respectively being formed with blade guiding notches adjacent the intersection of said grooves for guiding a blade during trimming of a spliced tape, said blade guiding notches having the same depth as said tape aligning groove, said block being made from a resilient plastic material so that the cutting edge of a blade will not be dulled by engagement with said block; and a pair of blade guiding means respectively located adjacent said side edges of said block in said strip accommodating groove respectively adjacent the opposite sides of the latter groove for guiding a blade to cut across a pair of overlapping tapes in said tape aligning groove prior to the application of an adhesive strip to said tapes, said blade guiding means aid said blade guiding notches being the only guide means for guiding a blade.

11. In a tape splicer, in combination, a member adapted to receive a pair of tapes on its top face; four mutually spaced projections fixed to and extending upwardly from said top face of said member, said projections defining between themselves a tape aligning groove and an adhesive strip accommodating groove extending across and intersecting said tape aligning groove and forming at their intersection a smooth, continuous uninterrupted, flat surface, said projections respectively being formed with blade guiding notches adjacent the intersection of said grooves for guiding a blade during trimming of a spliced tape; and a pair of blade guiding means fixed to said member in said adhesive strip accommodating groove respectively adjacent the opposite sides of the latter groove and respectively adjacent the opposite ends thereof for guiding a blade to cut across a pair of overlapping tapes in said tape aligning groove prior to the application of an adhesive strip to said tape, said blade guide means and blade guiding notches being the only means for guiding a blade.

References Cited in the file of this patent

UNITED STATES PATENTS

| | | |
|---|---|---|
| 2,101,458 | Sachtleben | Dec. 7, 1937 |
| 2,552,148 | Carson | May 8, 1951 |
| 2,599,667 | Tall | June 10, 1952 |
| 2,660,221 | Simpson | Nov. 24, 1953 |
| 2,724,436 | Constantine | Nov. 22, 1955 |